US008359657B2

United States Patent
Mykland et al.

(10) Patent No.: US 8,359,657 B2
(45) Date of Patent: Jan. 22, 2013

(54) METHOD AND APPARATUS FOR ENABLING SECURE DISTRIBUTION OF DIGITAL CONTENT

(75) Inventors: Robert K. Mykland, Capitola, CA (US); Lee H. Kasper, Moorpark, CA (US); Martin L. Samuels, Antioch, CA (US)

(73) Assignee: Sandcastles Technology Inc., Woodland Hills, CA (US)

( * ) Notice: Subject to any disclaimer, the term of this patent is extended or adjusted under 35 U.S.C. 154(b) by 402 days.

(21) Appl. No.: 12/750,280

(22) Filed: Mar. 30, 2010

(65) Prior Publication Data
US 2011/0247075 A1 Oct. 6, 2011

(51) Int. Cl.
H04L 29/06 (2006.01)
(52) U.S. Cl. ............... 726/29; 713/189; 726/21; 726/22
(58) Field of Classification Search .................. None
See application file for complete search history.

(56) References Cited

U.S. PATENT DOCUMENTS

| | | | | |
|---|---|---|---|---|
| 6,792,543 B2 * | 9/2004 | Pak et al. | ......................... | 726/24 |
| 7,263,188 B2 * | 8/2007 | Kohno | ........................... | 380/231 |
| 7,509,687 B2 * | 3/2009 | Ofek et al. | ...................... | 726/30 |
| 7,523,507 B2 * | 4/2009 | Leinonen et al. | ................ | 726/32 |
| 7,792,756 B2 * | 9/2010 | Plastina et al. | ................... | 705/51 |
| 7,849,016 B2 * | 12/2010 | So | .................................... | 705/59 |
| 8,095,991 B2 * | 1/2012 | Bellwood et al. | ................ | 726/30 |
| 8,140,439 B2 * | 3/2012 | Olson et al. | ....................... | 705/57 |
| 8,209,396 B1 * | 6/2012 | Raman et al. | .................. | 709/217 |
| 8,220,065 B2 * | 7/2012 | Yanase et al. | .................. | 726/32 |
| 2005/0278794 A1 * | 12/2005 | Leinonen et al. | ............... | 726/32 |
| 2008/0034444 A1 * | 2/2008 | Sears | .............................. | 726/29 |
| 2009/0217343 A1 * | 8/2009 | Bellwood et al. | ................ | 726/1 |

* cited by examiner

*Primary Examiner* — Nathan Flynn
*Assistant Examiner* — Michael R Vaughan
(74) *Attorney, Agent, or Firm* — K&L Gates LLP

(57) ABSTRACT

A digital content management system includes a host machine and a delivery machine remote from the host machine. The host machine sends validation agent software to the delivery machine, which executes the validation agent. The validation agent performs one or more tests or observations to determine whether the delivery machine has been compromised, and communicates the results of the tests or observations to the host machine. If the host machine determines that the delivery machine has not been compromised, the host machine sends digital content to the delivery machine, and a player module at the delivery machine delivers the content to the user according to an appropriate set of access rights. After delivering the content, the delivery machine deletes the content to prevent unwanted access to the content. The content can contain signals indicative that the content is legitimate, such as watermarks or bad code segments or sectors.

4 Claims, 4 Drawing Sheets

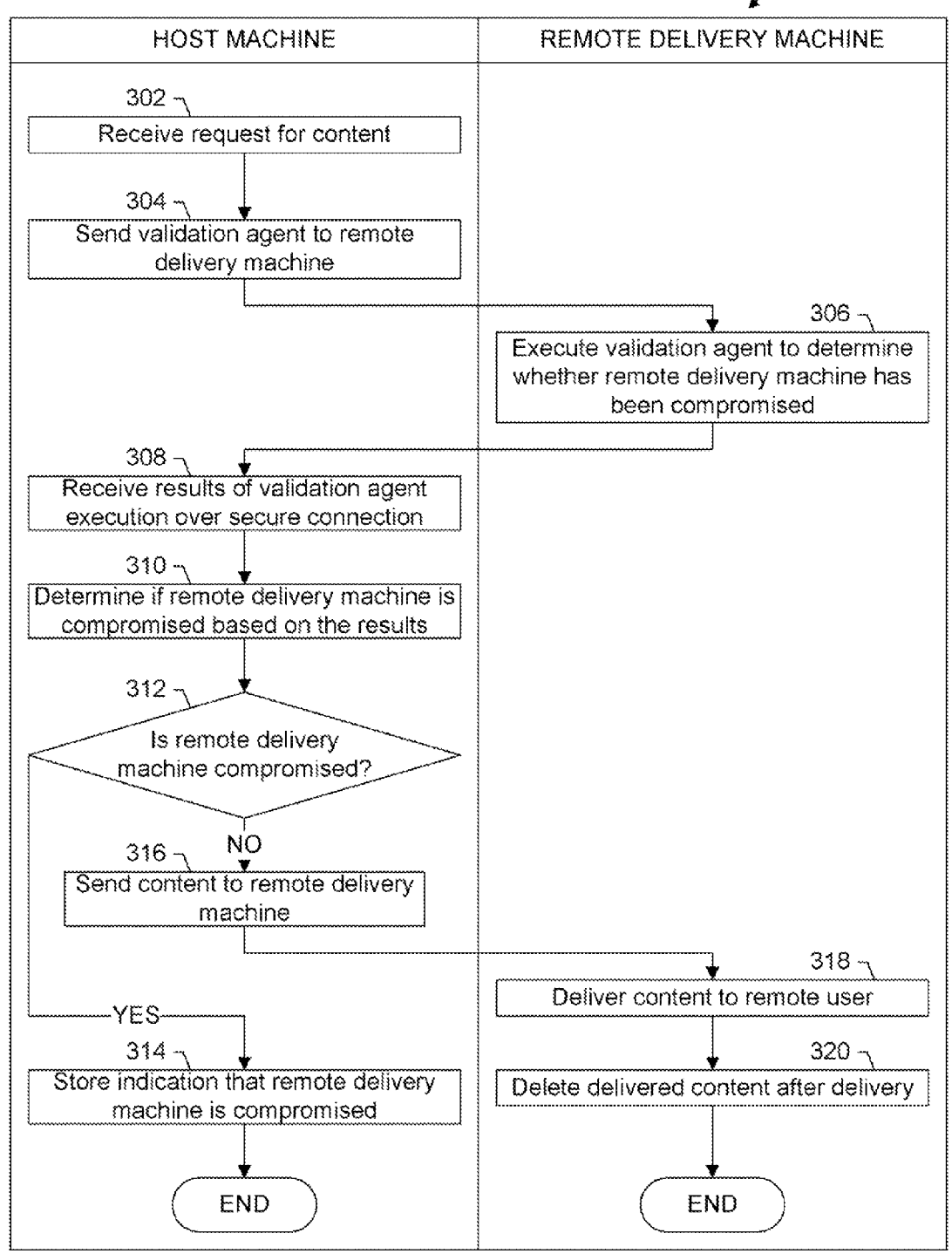

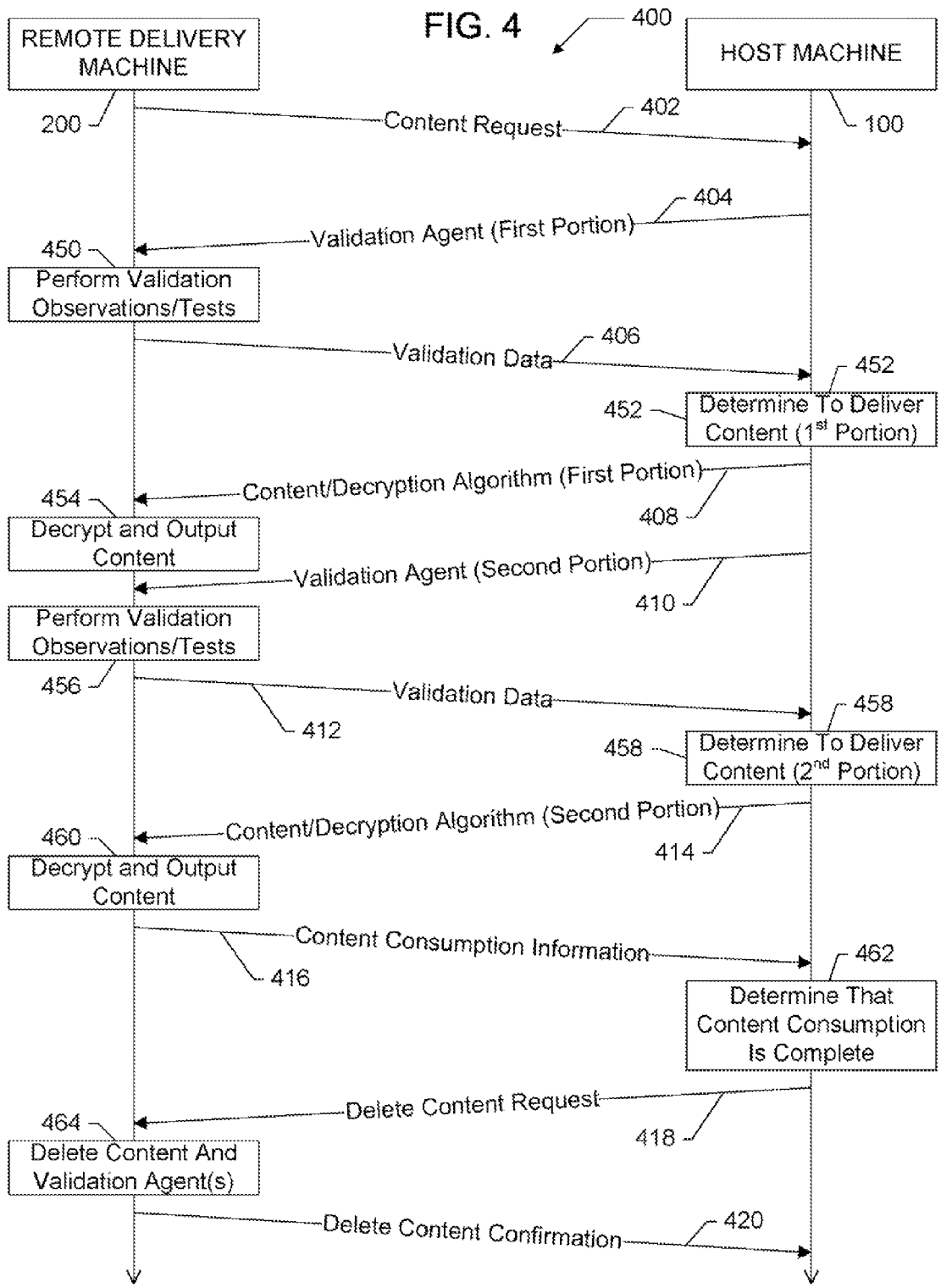

METHOD AND APPARATUS FOR ENABLING SECURE DISTRIBUTION OF DIGITAL CONTENT

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

TECHNICAL FIELD

The present disclosure relates in general to systems for controlling access to digital content, such as digital media. More specifically, the present disclosure relates to systems for controlling access to digital content by causing a host machine to send an agent to a remote delivery machine prior to sending digital content, stored on the host machine, to the delivery machine for delivery to a remote user.

BACKGROUND

It is known to encrypt data to prevent unwanted recipients from easily determining the contents of the data. That is, it is known to apply an encryption algorithm to otherwise legible data (such as a written message) to result in illegible, encrypted data. This encrypted data can be transmitted to an intended recipient, and is illegible to anyone who intercepts the data, in its encrypted form. Upon receipt by the intended recipient, the encrypted data can be decrypted using an algorithm designed to reverse the effect of the original encryption algorithm. Application of the combination encryption and decryption algorithms enables the sender/encryptor to control access to the underlying data to only those individuals who possess the decryption algorithm.

One weakness of the described encryption/decryption methods or schemes is that the described encryption/decryption schemes can be broken using appropriate techniques. For example, certain trial-and-error attempts, frequency analysis techniques, physical compromise of a host machine, knowledge by a hacker of the make-up of a portion of an encrypted set of data, and myriad other encryption breaking techniques could result in successful breaking of an encryption/decryption scheme.

The concept of rights management of digital content (whether in the form of software, video, music, or other digital content) began with the development of so-called superdistribution in the 1980s. In such superdistribution systems, content is delivered to a consumer of the content (e.g., a listener of digital music) stored on a delivery machine in encrypted form. The delivery machine includes content delivery software to enable the consumer to access the encrypted content. For example, the content delivery software could be a proprietary music player that includes an algorithm for decrypting encrypted digital music content. In addition to decrypting the encrypted content, such software can enable the distributor of the content to enforce rules about content usage, and can enable the consumer to provide payments in exchange for consuming the content.

These superdistribution systems possess certain drawbacks. First, since the encrypted data is static on the delivery machine, the encrypted data is susceptible to substantial brute-force attempts to decrypt. That is, because of the unlimited temporal access to the encrypted data, a pernicious user may attempt unlimited amounts of code breaking and reverse engineering of the encrypted data itself. Second, since the usage tracking and content delivery software is present on the delivery machine and accessible to the user, such usage tracking and content delivery software is also susceptible to reverse engineering. If such reverse engineering is successful, even if the encryption of the data itself remains intact, the usage tracking and content delivery software can be modified not to keep track of how many times the encrypted content is used. Likewise, the usage tracking and content delivery software can be modified to believe that the attempted uses of the content have been paid for, when in fact they have not. Either situation effectively enables unlimited access to the content.

More recent content distribution systems and schemes have sought to protect against unwanted use or distribution of digital content by relying on periodic or continuous connections to a data network such as the Internet. In such systems, a delivery machine (such as a personal computer) connects to a central server over the Internet to obtain permission to make content available to a person at the delivery machine. This connection to the central server via the Internet enables a content distributor to track usage of the content. Systems relying on such data network connections can also cause the delivery machine to remove copies of the encrypted digital content, if such copies of the encrypted digital content are stored on erasable or re-writable media.

Despite the reliance on a connection to the Internet to provide access to digital content, such systems are nonetheless subject to unwanted access to the encrypted content. For example, the connection to the Internet could be "snooped" or "spoofed," such that the delivery machine believes it has received authorization from the central server to distribute the content, while it in fact has not received such authorization. When such a connection is "snooped," software or hardware external to the encrypted content intercepts the signal sent from the central server to the delivery machine for use in any one of a number of ways. When a connection is "spoofed," software or hardware external to the encrypted content mimics some or all of the signals expected to be received by the delivery machine (such as signals determined by the described "snooping") from the central server, wherein such mimicked signals indicate to the delivery machine that the user should be allowed access to the encrypted data. Alternatively, spoofing could include the creation of signals which mimic or otherwise resemble signals that are expected by the server, such that the server behaves as desired by the spoofing party. Though the described "snooping" and "spoofing" has been described with respect to the signals received by the delivery machine, it should be appreciated that such "snooping" and "spoofing" could similarly alter the signals sent to the central server; for example the altered signals could cause the central server to believe that the usage of the content was different from the actual usage, or to believe that the encrypted content does not continue to exist on the delivery machine despite its continued existence.

Another technique for controlling the availability of digital content is known as watermarking. Watermarking involves inserting a signal (i.e., a "watermark") into digital content that does not impact the functionality, appearance, or other characteristics of the digital content. The watermark can be later extracted from the content to determine whether the content is the same as that which was initially released. Watermarking can be used to uniquely identify content that has been stolen, thus enabling better tracking of security breaches that lead to such theft. Moreover, watermarking enables identification of the source of stolen content. However, watermarking does not actually prevent piracy or theft of digital content—it merely enables a user with knowledge of the watermark's whereabouts in the content to verify that the content is the same as that which was released by the contents originator or creator.

Many of the above-described mechanisms for controlling the distribution of digital content involve the distribution of the content, in full and in encrypted form, to a delivery machine. After delivery in each of these mechanisms, the content resides on a memory device of the delivery machine.

Another, different approach to content management involves streaming content to the delivery machine as that content is needed for consumption. In such approaches, a server delivers content to a delivery machine via a data network in small parts that are individually stored, synchronized by content access software (e.g., a media player), delivered for consumption (e.g., played), and discarded. Though such content delivery systems were developed with the initial goal that a user could begin viewing or otherwise consuming content upon delivery of the first of the small parts of the content (rather than upon delivery of the entirety of the content), such systems possess security-based benefits as well. For example, the content only exists in small portions and only for a very limited amount of time. Thus, unauthorized reproduction of the content is impractical and difficult. Further, if each small portion of the content is encrypted as discussed above, additional steps must be taken to make unauthorized copies of the content.

Even with the advent of broadband Internet access in homes, schools, and places of business, the inability to stream certain data-intensive content still limits use of this mechanism. Moreover, the data delivered by streaming is subject to reverse engineering and compromise. For example, instead of being discarded, the small portions of content can be intercepted and assembled into the digital content itself, which can be copied and distributed in its entirety.

Attempts have been made by operating system designers to develop operating systems which enable digital content to remain encrypted until it is delivered to an appropriate hardware device (such as a sound card or graphics card) for consumption. Such encryption ideally prevents software running on top of the operating system from intercepting and altering the encrypted digital content. However, as with all of the types of software described above, operating systems themselves are vulnerable to reverse engineering. Though security holes are frequently plugged through updates distributed by operating system developers, such holes represent avenues through which encrypted digital content can be compromised.

Thus, it is desirable to create a content management system wherein the amount of access to an encrypted message is limited, thus limiting the ability to try to break the encryption algorithm. It is further desirable to create a content management system wherein the algorithms and mechanisms used to encrypt and decrypt data can change frequently without requiring user interaction. It is further desirable to create a content management system wherein a software agent distributed to a delivery machine in real time determines whether the delivery machine has suffered a security breach and to securely communicate any such breathes with a server.

SUMMARY

The present disclosure relates generally to systems, apparatus, and methods for controlling access to digital content by a remote user. More particularly, the present disclosure relates to a system including a host machine and a delivery machine for delivering digital content to a user who is remote from the host machine. In one embodiment, the host machine acts as both a content server for sending content to the delivery machine and as a validation machine for validating that the delivery machine has not been compromised. In this embodiment, the delivery machine executes player software to deliver the content to a remote user at the delivery machine.

From a remote user's perspective, the disclosed system provides a similar experience to that provided by known content management systems. That is, the disclosed system enables delivery of content based on amounts of usage of content, times of usage of content, amounts of money or other consideration provided by the remote user in exchange for consumption of the content, or other appropriate determining factors for delivery of content. Moreover, the disclosed system enables delivery of the same types of content previously deliverable to users, and is not limited in any way by the type of content delivered for consumption. For example, the disclosed content management system enables the delivery of audio content, video content, program code or application content, or any other type of digital content. The disclosed system, however, provides substantial benefits over known content management systems by ensuring secure delivery of content and by reducing the potential points in the content delivery process at which the delivery of content could be compromised or hijacked, as discussed below.

A host machine as disclosed herein provides or enables the content management disclosed herein. In one embodiment, the host machine of the disclosed content management system stores content to be delivered to a remote user at a delivery machine. The host machine also stores and executes software for communicating with the delivery machine to validate the delivery machine and to deliver the stored content. In one embodiment, the host machine is configured to communicate with the delivery machine using a secure communication protocol, such as a Secure Sockets Layer (SSL) protocol, a Transport Layer Security (TSL) protocol, or some other similar form of point-to-point encryption. In one embodiment, all communication between the host machine and the delivery machine is performed using the secure communication protocol. In another embodiment, at least some of the communication between the host machine and the delivery machine, such as the sending of the agent to the delivery machine (to be discussed in detail below) is accomplished using an unsecure protocol, such as a standard Internet protocol. To heighten the security provided by the system, the host machine may be located in a facility (or in an area of a facility) not accessible to the remote user, either physically or electronically via a data network.

The delivery machine of the disclosed content management system enables a user, remote from the host machine, to consume content stored on the host machine. In one embodiment, the delivery machine is a computing device such as a personal computer, a set top box, or a game console that enables a user using the delivery machine to consume digital content. For example, if the digital content includes digital video content, the delivery machine enables the user to view the digital video content. In addition, the delivery machine may be configured to execute validation agent software provided by the host machine to enable the host machine to validate that the delivery machine is not compromised, and that the delivery machine may properly output the digital content to the remote user.

The disclosed system manages access to digital content by storing, on the host machine, one or more security agents for sending to the delivery machine. In one embodiment, the security agent is a software module or program executable by the delivery machine to send data indicative of a status of the delivery machine to the host machine. This data indicative of the status informs the host machine whether the security machine has been compromised.

More specifically, in one embodiment, after determining to send content to a delivery machine (such as upon receiving a request for stored content from the remote user at the delivery machine), the host machine sends the validation agent to the delivery machine for execution. Upon receiving the validation agent, the delivery machine executes the validation agent. The executing validation agent performs one or more searches, tests, or other hardware or software observations of the delivery machine to ascertain whether the delivery machine has been compromised. For example, the validation agent may perform a memory or media search to ensure that the correct software (such as the correct player, the correct usage tracking software, or the correct secure payment system) is installed on the delivery machine and has not been tampered with. Alternatively or in addition, the validation agent may determine that the hardware and/or software of the delivery machine have not been compromised, or that the validation agent itself is not being spoofed or has been otherwise captured in a virtual environment.

After having performed any appropriate tests as described, the validation agent in one embodiment sends data indicative of the outcome of the test(s) and/or search(es) to the host machine. Based on these received outcomes, the host machine determines whether the delivery machine has been compromised. If the host machine determines that the delivery machine has been compromised, the host machine does not deliver any content to the delivery machine. In one embodiment, the host machine also stores an indication that the delivery machine has been compromised, such as to enable investigation of the potentially compromised machine.

If the host machine determines that the delivery machine has not been compromised, the host machine sends the appropriate content to the delivery machine for outputting to the remote user. In one embodiment, a player software module on the delivery machine provides the appropriate output of the digital content to the user. The player software may be resident on the delivery machine, such as by being an installed software module of the delivery machine. Alternatively, the host machine may send the player module as part of, or in association with, the delivered content. In either case, operation of the player depends upon the type of digital content to be consumed by the user. For example, the host machine may send digital video content to the delivery machine for display to the user using appropriate video player software on the delivery machine.

The amount of consumption of digital content by a user enabled by the disclosed content management system can vary. For example, the player module may enable a user to cause the content to be outputted only once, without enabling a local copy to be saved. Alternatively, the player module may enable the user to repeatedly consume the content during a designated time period. It should be appreciated that any varying amounts and quantifications of consumption of the content by the user are within the scope of the instant disclosure.

In one embodiment, if the determination is that the delivery machine has not been compromised, the content is sent to the delivery machine in an encrypted format. In this embodiment, a software module on the delivery machine decrypts the content prior to outputting a representation of the content. For example, software implementing a player on the delivery machine may include one or more decryption modules to decrypt the encrypted content prior to outputting the content. Alternatively, the validation agent may include a decryption module which decrypts the content prior to passing the decrypted content to a separate player module for output to the remote user.

In one embodiment, after receiving the content and outputting it for consumption as desired by the remote user, the delivery machine deletes the content. For example, if the content is streamed to the delivery machine according to known streaming methods, the delivery machine may not store the content in any persistent way beyond what is needed to decrypt the content. In one embodiment, the player software which enabled the content to be outputted to the user deletes the content. In another embodiment, the validation agent deletes the content. In one embodiment, the content itself contains one or more software modules which cause the delivery machine to delete the content at the end of the users consumption of the content Further, the content delivered to a remote delivery machine may never be saved locally at all. For example, each audio and video frame of a received movie may overwrite the previous frame(s) in memory, such that no copy of a discernable portion of the delivered movie is ever stored in memory.

The disclosed validation agent can operate in one or more layers of software of the delivery machine as disclosed herein. In one embodiment, the validation agent only operates on an operating system, and performs appropriate tests, searches and other observation at the operating system level. In another embodiment, wherein an operating system of the delivery machine includes a kernel layer interacting directly with the hardware of the computer and a virtual machine layer interacting with software applications and with the kernel layer, the disclosed system enables validation of both the kernel layer and the virtual machine layer. In this embodiment, the validation agent performs tests similar to those described above at both the kernel layer and at the virtual machine level. Based on the results of these tests, the host machine determines whether either the kernel layer or the virtual machine layer has been compromised. If either has been compromised, in one embodiment the host machine does not deliver the content and instead stores an indication of the compromised delivery machine.

The disclosed system can also insert one or more code segments into a piece of digital content to control access to the digital content. For example, the disclosed content management system can insert one or more watermarks into a piece of digital content, wherein the watermark(s) do not impact consumption of the digital content. In this example, the content provider, knowing the precise location of the watermark, can determine whether versions of the digital content distributed and/or consumed by users are legitimate copies of the digital content based on the presence or absence of such watermarks. In another example, the provider of content can insert one or more lines of bad code into the digital content. An authorized player module knows to look for the bad code, and only outputs the content to a user if the bad code is present. On the other hand, if a copy of the content is made, the bad code may not be copied in the process. Thus, when an authorized player module looks for the bad code, it will not find the bad code, and will not output the content. Likewise, if an unauthorized player module is utilized, the bad code in a legitimate copy of the digital content will prevent the player module from outputting the content. These embodiments are exemplary of types of data that can be inserted into content, and which can thereafter enable management and control of the use and distribution of that content.

It should be appreciated that the disclosed content delivery management system can be implemented with one or more host machines and/or one or more delivery machines. For example, certain host machines could store certain types or subsets of content that is deliverable to any of a plurality of delivery machines. Moreover, a plurality of different delivery machines could enable a plurality of remote users to each request the same content from a same host machine. It should be appreciated that the architecture of the disclosed system in this regard could be expanded as is well known in the art.

It is therefore an advantage of the present disclosure to provide a system which enables a determination of whether a delivery machine has been compromised each time the delivery machine requests data from a host machine. In this way, the disclosed system can avoid distributing content to compromised delivery machines altogether, which eliminates or reduces the ability of a nefarious user to misappropriate the content by way of an attack on the player itself, the delivery of content to the user, the usage tracking or management features of the system, the streaming functions of the system, or the secure payment functions of the system.

It is an additional advantage of the present disclosure to provide a validation agent whose characteristics can be varied frequently over time without requiring substantial action by the remote user to continue utilizing the disclosed digital content management system. For example, the host machine of the disclosed system can store changing versions of the validation agent, such as versions of the validation agent that vary the encryption and decryption mechanisms, the observations and tests relied on to determine whether the delivery machine is compromised, the content of reports generated about the content delivery process, or other characteristics of delivery of digital content. It should be appreciated that these variations enable frequent modification of the current version of the validation agent, such that the amount of time required to reverse engineer the validation agent becomes prohibitive. Moreover, these variations enable the changes to the validation agent to be made quickly enough that it is impossible or very difficult to reverse engineer or otherwise hijack the validation agent, the encryption/decryption scheme, or other components of the disclosed content distribution system prior to those components changing and rendering previous reverse engineering efforts unsuccessful. Thus, it is an advantage of the disclosed system to enable content distributors to remain one step ahead of users with the nefarious intent to circumvent content control protocols.

Additional features and advantages are described in, and will be apparent from, the following Detailed Description and the figures.

BRIEF DESCRIPTION OF THE FIGURES

FIG. 3 is a flow chart of an example process for distributing content using the disclosed content delivery management system and for deleting the distributed content upon its consumption by the end-user.

FIG. 4 is a message flow diagram of an example set of messages that are exchanged between a remote delivery machine and a host machine during the delivery of content disclosed herein.

DETAILED DESCRIPTION

Figure 1:
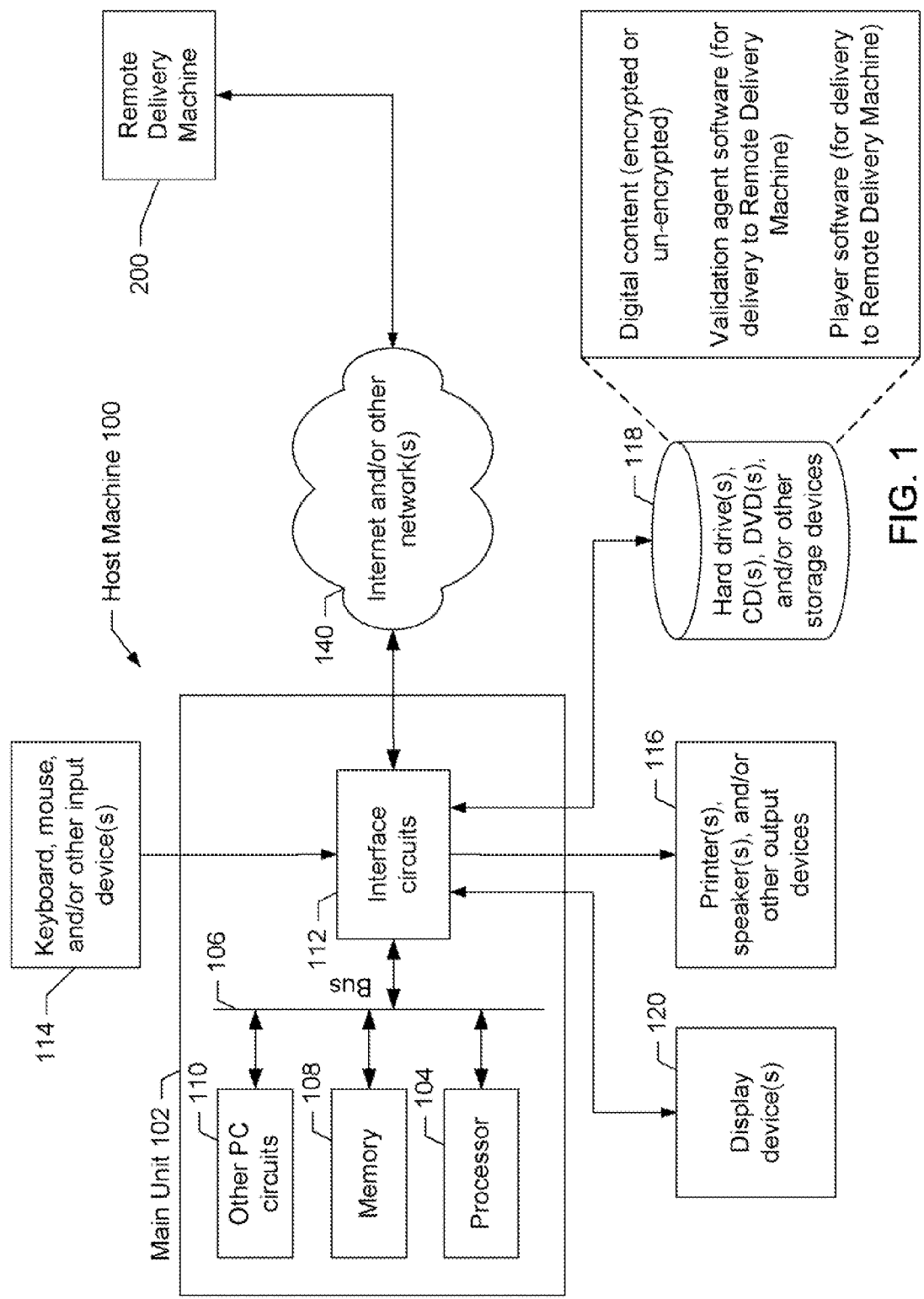
FIG. 1 is a schematic block diagram of an example system architecture for implementing the content delivery management system disclosed herein, and includes schematic diagrams of the disclosed host machine and the disclosed remote delivery machine.

FIG. 1 is a block diagram of an example system architecture for implementing the content distribution management system disclosed herein. Specifically, FIG. 1 illustrates a schematic block diagram of a host machine (e.g., host machine 100) and a remote delivery machine (e.g., remote delivery machine 200) for implementing the disclosed content distribution management system.

In the example architecture, the host machine 100 includes a main unit 102 which preferably includes one or more processors 104 electrically coupled by an address/data bus 106 to one or more memory devices 108 other computer circuitry 110, and one or more interface circuits 112. The processor 104 may be any suitable processor. The memory 108 preferably includes a combination of volatile memory and non-volatile memory. Preferably, the memory 108 stores a software program that interacts with the other devices in the system as described below. This program may be executed by the processor 104 in any suitable manner. The memory 108 may also store digital data indicative of documents, files, programs, web pages, etc. retrieved from a remote delivery machine 200, such as data indicative of the hardware and software capabilities of the remote delivery machine 200 and/or data indicative of a request for content to be distributed to the remote delivery machine 200. In one example described in more detail below, the memory 108 stores, at least temporarily, validation agent software distributable to the remote delivery machine 200 to verify that the remote delivery machine 200 has not been compromised and a player application distributable to the remote delivery machine 200 to display or otherwise output content for consumption by an end user at the remote delivery machine 200.

The interface circuit 112 may be implemented using any suitable interface standard, such as an Ethernet interface and/or a Universal Serial Bus (USB) interface. One or more input devices 114 may be connected to the interface circuit 112 for entering data and commands into the main unit 102. For example, the input device 114 may be a keyboard, mouse, touch screen, track pad, track ball, isopoint, and/or a voice recognition system.

One or more displays 120 or printers, speakers, and/or other output devices 116 may also be connected to the main unit 102 via the interface circuit 112. The display 120 may be a cathode ray tube (CRT), liquid crystal display (LCD), or any other type of display. The display 120 may generate visual displays of data generated during operation of the host machine 100, such as those screen shots described below. For example, the display 120 may be used to display data indicative of tests and/or observations performed on the remote delivery machine 200 and returned to the host machine 100. Alternatively or in addition, the display 120 may be used to display an indication of which content has been distributed to the remote delivery machine 200. It should be appreciated that the display 120 may not be present in the disclosed content distribution management system. Specifically, if the disclosed system is configured to serve content to remote delivery machine 200 without human interaction with the host machine 100 during normal operation, a display 120 may not be needed.

One or more storage devices 118 may also be connected to the main unit 102 via the interface circuit 112. For example, a hard disk drive, a compact disc (CD) drive, a digital versatile disc (DVD) drive, a tape drive, and/or any other suitable storage device may be connected to the main unit 102. The storage devices 118 may store any type of data used by the host machine 100 or sent to the remote delivery machine 200.

In one example, described in more detail below, the storage device 118 stores information indicative of digital content (such as encrypted or un-encrypted digital audio content, digital video content, or other type of content), software executable by the remote delivery machine 200 as a validation agent, and/or software executable by the remote delivery machine 200 as a player to enable playback, output, or other consumption of the distributed digital content. The player software, when executed by the remote delivery machine 200, may also send data indicative of an amount of usage of the content (such as the number of times video content has been played) to the host machine 100. This data, stored on storage device 118, may be selectively distributed to the remote delivery machine 200 as described in detail below.

The host machine 100 may exchange data with one or more remote delivery machines such as remote delivery machine 200 using a connection to network 140. The network connection may be any suitable network connection, such as an Ethernet connection, digital subscriber line (DSL), telephone line, coaxial cable, etc. The data exchanged between the host machine 100 and the remote delivery machine 200 may include digital content, validation agent software, player software, authentication information, and any other suitable types of material as described in detail below.

It should be appreciated that other suitable system architectures are contemplated by the disclosure herein. For example, architectures including a plurality of remote delivery machines 200 are contemplated. Likewise, architectures wherein a plurality of host machines 100 serve content and software to one or more remote delivery machines 200 are contemplated by the instant disclosure. Thus, in one embodiment, the disclosed system includes a plurality of host machines 100 which each serve content and/or software to one or more of a plurality of remote delivery machines 200 over some network 140, such that any of the remote delivery machines 200 can obtain the digital content stored on the storage device 118 of any of the host machines 100. Likewise, architectures in which the host machine 100 lacks one or more of the components illustrated in FIG. 1, such as the display device 120 or the input device 114, are contemplated.

Figure 2:
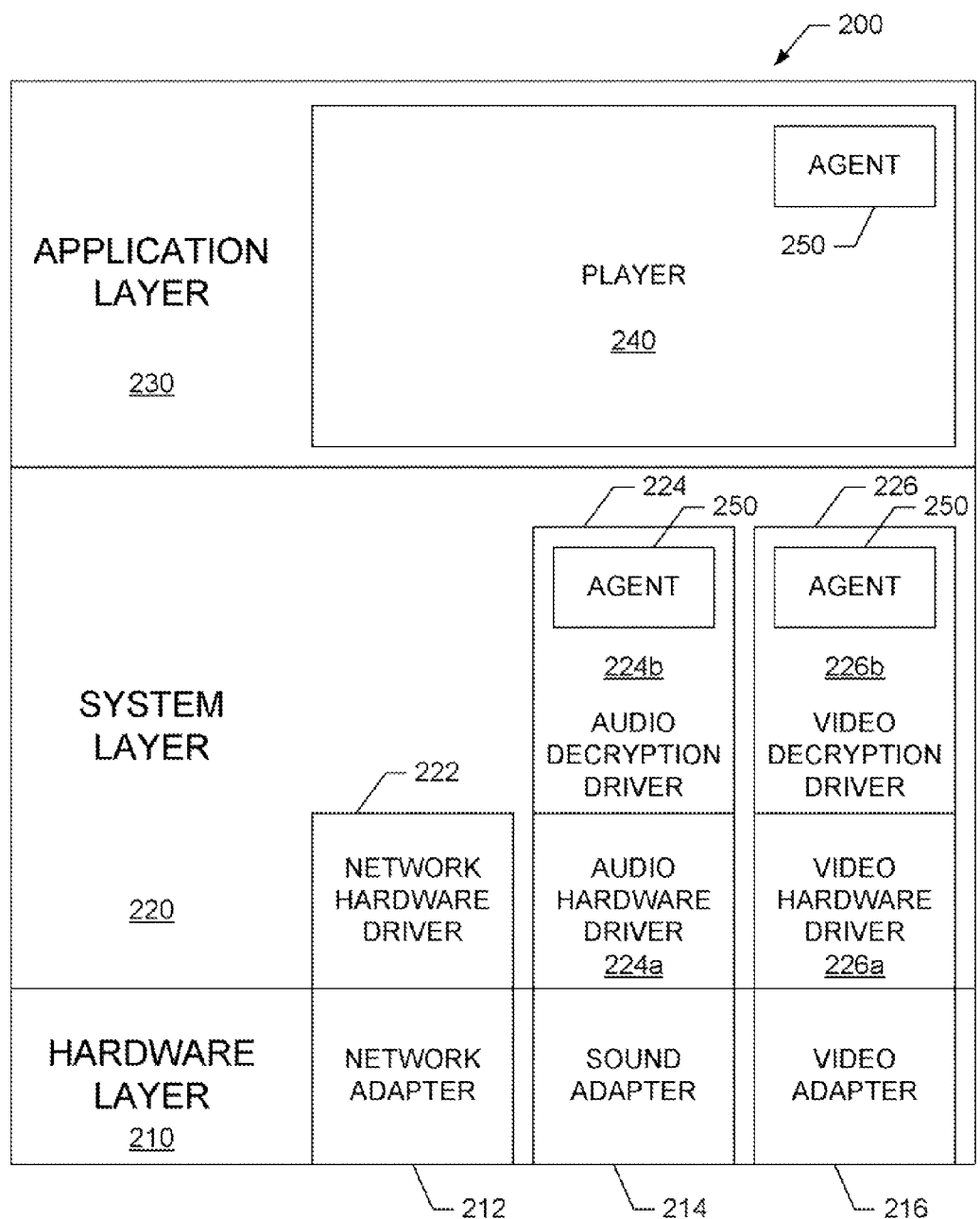
FIG. 2 is a schematic block diagram of a plurality of layers of software and/or hardware associated with an example remote delivery machine, which are utilized to implement the disclosed content delivery management system.

FIG. 2 is a schematic block diagram of the hardware and software layers associated with an example remote delivery machine 200. In the illustrated embodiment, the described hardware and software layers are utilized to implement the various security and content output features of the disclosed content delivery management system described in detail below. FIG. 2 illustrates three layers present in an example remote delivery machine 200: a hardware layer 210, a system layer 220, and an application layer 230.

The hardware layer 210 illustrated in FIG. 2 includes the actual hardware components of remote delivery machine 200 which enable the remote delivery machine 200 to connect to the network 140 and to play back or otherwise output content to an end user. Specifically, hardware layer 210 includes a network adapter 212, a sound adapter 214, and a video adapter 216. In the illustrated embodiment, network adapter 212 enables the remote delivery machine 200 to communicate with the host machine 100 via the network 140. Sound adapter 214 enables digital audio content to be converted into sounds audible to the end user. Video adapter 216 enables digital video content to be converted into images or videos viewable by the end user. It should be appreciated that the illustrated hardware layer 210 is merely illustrative, and in various embodiments the remote delivery machine 200 includes other hardware components at its hardware layer to enable an end user to more comprehensively interact with the remote delivery machine 200.

The system layer 220, illustrated in FIG. 2, which may also be referred to as a hardware dependent layer or a kernel layer, includes software modules configured to interact directly with the hardware components of the hardware layer 210. These software modules provide a generic interface to other software (such as application software) running on the remote delivery machine 200, and enable this other software to, for example, send a generic "play sound" command to the system layer 220. Upon receipt of such a generic "play sound" example command, the system layer 220 interacts with the hardware layer 210 to cause the actual sound playback hardware of the remote delivery machine 200 to output the desired sound.

In the illustrated embodiment of the remote delivery machine 200, the system layer 220 includes a network hardware driver 222 for interacting with the network adapter 212 and enabling communication over the network 140. The system layer 220 also includes an audio hardware driver 224a and a video hardware driver 226a for interacting with the sound adapter 214 and the video adapter 216, respectively. These drivers may provide the described generic interface to the sound and video playback hardware such that applications running on top of the system layer 220 can easily interact with the hardware layer 210 without having to be aware of the specifics of the hardware layer 210.

The illustrated system layer 220 also includes an audio decryption driver 224b and a video decryption driver 226b to decrypt encrypted audio and video content provided to the system layer 220 by the application layer 230 prior to sending that content to the appropriate hardware device for output. In the illustrated example, the audio decryption driver 224b and the video decryption driver 226b each include a portion of an agent 250 to aid in the decryption of the appropriate content. For example, the agent 250 may include the appropriate decryption algorithm usable to decrypt audio or video content. Alternatively or in addition, the agent may perform certain security and other validation checks at the system layer 220, to confirm that the remote delivery machine 200 has not been compromised at the system layer. Since the decryption algorithm could change over time, the agent may be provided in real-time or near real-time by the host machine 100 as discussed in detail below.

Finally, FIG. 2 illustrates that remote delivery machine 200 includes an application layer 230 running on top of the system layer 220 and the hardware layer 210. The application layer, alternatively referred to as the virtual machine layer or the user layer, utilizes the generic interface provided by the system layer to interact with the hardware and output audio and visual content to the end user. The application layer 230 may execute application software, such as email client software, web browser software, word processing software, and other software with which the user directly interacts. In addition, in the illustrated example, the application layer includes a player 240 for outputting the content distributed to the remote delivery machine 200 by the host machine 100. For example, the player could include an audio player or a video player for playing back audio, video, or audio/video content. As illustrated, the player 240 also includes an agent 250 for validating that the remote delivery machine 200 has not been compromised at the application layer 230.

It should be appreciated that alternative hardware/software configurations of the remote delivery machine 200 of the disclosed system could be implemented. For example, the agent 250 need not exist at both the application layer 230 and the system layer 220—rather, the agent could execute only at the application layer 230. In this example, the system may assume that the system layer 220 is not compromised, or may base its determination that the system layer 220 is not compromised on alternative data obtained from a source other than the agent 250. Similarly, though most computers currently include at least the three layers illustrated in FIG. 2, the remote delivery machine 200 may alternatively include fewer layers or more layers. For example, if the remote delivery machine is a specialized computing device, designed only to deliver a certain type of content, the remote delivery machine may include only a hardware layer and an application layer, and may not include the intervening system layer. Such alternative configurations are contemplated by the instant disclosure.

FIG. 3 is a flow chart of an example process 300 for distributing content from a host machine 100 to a remote delivery machine 200. Although the example process 300 is described with reference to the flow chart illustrated in FIG. 3, it should be appreciated that many other processes of distributing content and controlling access to that content are contemplated. For example, the order of certain of the blocks may be changed, and certain of the blocks described are optional.

The process 300 of FIG. 3 may be executed by a system such as that illustrated in FIG. 1 including a host machine 100 and a remote delivery machine 200. The host machine 100 may act as a content server, and may also serve validation agent software to ensure that the remote delivery machine 200 has not been compromised prior to distributing content to the remote delivery machine 200. It should be appreciated that the following description of process 300 relates to the host machine 100 serving content to the remote delivery machine 200, with much of the analysis of whether the remote delivery machine 200 has been compromised being performed by the host machine 100. It should be appreciated that many other hardware and/or software configurations are contemplated for executing process 300, such as configurations wherein one or more of the decisions and/or actions indicated by process 300 as being performed by the host machine 100 are performed by the remote delivery machine 200, or vice versa.

The process 300 of FIG. 3 begins when the host machine 100 receives a request for content (block 302). This request for content may originate from a user at remote delivery machine 200, or may originate from some other location. For example, the request may be made according to a schedule defined by a user, and thus may not require a specific request provided by the remote delivery machine 200. In response to receiving the request for content (block 302), the host machine 100 distributes a validation agent to the remote delivery machine 200 (block 304). The validation agent may be software stored on one or more storage devices of the host machine 100 which, when distributed to the remote delivery machine 200, can be executed on the remote delivery machine 200 to determine whether the remote delivery machine 200 has been compromised.

Upon receiving the validation agent, the remote delivery machine 200 executes the validation agent to assist the host machine 100 in determining whether the remote delivery machine 200 has been compromised, and thus whether to deliver content to the remote delivery machine 200 (block 306). For example, the validation agent may execute one or more tests or perform one or more searches on the remote delivery machine 200, the results of which enable either the remote delivery machine 200 or the host machine 100 to determine whether the remote delivery machine 200 has been compromised.

Upon the remote delivery machine 200 executing the validation agent, the host machine 100 receives the results of the validation agent execution over a secure connection (block 308). The host machine may receive these results, as opposed to enabling the remote delivery machine retaining the results, such that the possibility of illicit software on the remote delivery machine analyzing and/or altering the results of the validation agent is reduced or eliminated.

The host machine 100 thereafter determines if the remote delivery machine 200 has been compromised based on the received results from the execution of the validation agent (block 310). If the host machine 100 determines that the remote delivery machine has been compromised (block 312), the host machine 100 stores an indication that the remote delivery machine is compromised (block 314) and does not send the requested content to the remote delivery machine.

If the host machine 100 determines that the remote delivery machine 200 has not been compromised (block 312), the host machine 100 delivers the requested content to the remote delivery machine 200 (block 316). For example, the host machine 100 may enable the remote delivery machine 200 to download the content as a single file, or may enable the remote delivery machine 200 to download the content in a streaming fashion for output to the user by the remote delivery machine 200. Upon receipt of the requested content, the remote delivery machine 200 delivers the content to the remote user (block 318), such as by displaying video content on a monitor or other video display device or by playing audio content through speakers or another appropriate audio output device.

The remote delivery system may deliver the content for consumption according to any one of a number of different consumption schemes. For example, the remote delivery system may deliver the content for consumption by outputting it a single time. Alternatively, the remote delivery system may deliver the content for consumption by outputting it a plurality of times during a predetermined time period, or by outputting it a designated quantity of times. The remote delivery machine may output the content for consumption by enabling each of a plurality of portions of the content to be consumed a designated quantity of times, such as one time. Any other content consumption scheme may be implemented by the remote delivery machine to deliver content to the remote user.

Upon outputting the content for consumption as appropriate (i.e., according to the appropriate content consumption scheme), the remote delivery machine deletes the delivered content (block 320). For example, if the content is to be streamed to a user a single time, the remote delivery machine 200 deletes the content as it is displayed, such that no permanent copy of the content is ever stored for a discernable amount of time on a storage device of the remote delivery machine 200. Alternatively, if the entirety of the content has been delivered to the remote delivery machine 200, the remote delivery machine 200 may delete the stored representation of the content when it has been completely consumed according to the appropriate content consumption scheme.

As used herein, the term content may refer to music, video, software, or other digital data distributable to an end user. Moreover, content could be distributed to the end user for any number of purposes or according to any number of distribution schemes. For example, content could be purchased by a user for continuous and unlimited use. Content could also be purchased by the user for repeated but non-unlimited use. Content could be purchased by the user for one-time use. Alternatively, content may be distributed to a user for limited use without payment of a fee, but in exchange for a fee, may be distributed to the user for unlimited use. Countless other distribution schemes of this type are well known in the art and any of these distributions can be implemented using the disclosed system.

The remote delivery machine may be a personal computer connected to the Internet. In this example, the remote delivery machine enables an end user to consume content through the output devices of the personal computer, such as through the computer's monitor and/or speakers. Alternatively, the remote delivery machine may be a different kind of microprocessor-based device connected to an appropriate output device. For example, the remote delivery machine could be a set-top box connected to a television and/or speakers, a gaming console connected to a television and/or speakers, or a specialized computer system designed solely or almost solely for outputting a certain kind of content. Still alternatively, the remote delivery machine could be a hand-held device such as a cellular telephone, a personal digital assistant ("PDA"), a laptop computer, a netbook computer, a tablet computer, an electronic-ink based reader, or any other appropriate microprocessor-based device capable of outputting digital content.

The host machine may be a microprocessor based computer device, such as a personal computer, a mainframe computer, a cluster or blade computer, or any other computer system capable of delivering content over a network. The host machine may be located physically remotely from the remote delivery machine, such that the end user does not have access to the host machine. For example, the host machine may be located in a physically secure place available to a distributor of content but not to a consumer of content. In this example, the physical security of the host machine eliminates or reduces the potential for compromise of the content by physical access by a nefarious user. In one embodiment, the host machine is configured to deliver content and any other digital data (such as the validation agent) to the remote delivery machine in a secure fashion. For example, the host machine may deliver content and/or other digital data using a Secure Sockets Layer ("SSL") protocol or using some other point-to-point encryption scheme. It should be appreciated that the host machine could be any suitable type of microprocessor-based device capable of distributing digital data and software.

The player software module, which may run on the remote delivery machine, can be software responsible for acquiring or receiving content and data from the host machine and delivering it to the user in an appropriate way. For example, the player may include a video player for receiving streaming video and outputting the streaming video to a display device of the remote delivery machine. The player may also be an audio player, a software environment for executing content which is distributed as executable software (e.g., a java virtual machine for executing java-based content), or any other software needed to output content to a consumer of the content.

The player may perform additional security functions in addition to those performed by the agent. For example, the player may be responsible for decrypting encrypted content or tracking the amount of usage or consumption of the content by the end user. The player may also be responsible for implementing a payment system for the content, such that a user can provide payment in exchange for the content distributed by the host machine to the remote delivery machine. In this example, the player may include a mechanism for enabling the user to enter a credit card number or a bank account number, or may track tokens, credits, or other indicia of value exchangeable by the user for use of the content. It should be appreciated that various decryption, usage tracking, and secure payment systems are well known in the art, and any appropriate such system could be implemented as part of the player disclosed herein.

The host machine disclosed herein may include at least one software-based service which runs on the host machine and facilitates delivery of content to the remote delivery machine. The service may be the software responsible for responding to requests received from the remote delivery machine, distributing the content and/or the validation agent, receiving any data sent back to the host machine by the validation agent, and determining whether the remote delivery machine is compromised based on data received from the validation agent. The service may also be the software that enforces any content consumption schemes, such as by tracking an amount of consumption of content by a user and/or by causing the content to be deleted or ensuring that the content has been deleted when the user has completely consumed the distributed content according to the appropriate content consumption scheme.

The term "validation agent" or "agent" is used herein to refer to the software distributed by the host machine to the remote delivery machine to validate that the remote delivery machine has not been compromised. The validation agent may be an autonomous piece of software capable of some ability to examine data of interest, persisting at least for the duration of the task for which it was designed, and communicating and coordinating, at least to some degree, with other software programs. A validation agent may further be capable of deleting itself upon exhaustion of its purpose.

For example, a validation agent may be distributed to a remote delivery machine 200, and upon distribution, may perform one or more observations, tests, or searches to determine whether the remote delivery machine has been compromised, oversee or otherwise monitor the delivery of content, and finally, upon completion of the tests and upon consumption of the content, may delete itself from the remote delivery machine. This may prevent or limit the validation agent itself from being compromised, as the validation agent is relatively transient and does not exist on the remote delivery machine long enough for a nefarious user to make a practical attempt at hacking or modifying the agent for unintended purposes.

The agent may be configured to examine the remote delivery machine and communicate the results of the examination back to the host machine. As discussed above, these results may enable the host machine to determine whether the remote delivery machine has been compromised. The agent may exist on the remote delivery machine for only a short period of time (e.g., during the consumption of the content) or may persist for a longer period of time (e.g., across the consumption of multiple different pieces of content). The validation agent may be configured to communicate with the host machine over a secure connection, such as using a SSL protocol, as is well known in the art.

In one embodiment, wherein the validation agent exists for only a short period of time, the host machine may distribute different or changing versions of the validation agent over time. For example, for the distribution of a first piece of content, the host machine may distribute a first version of the validation agent. For the distribution of a different second piece of content, the host machine may distribute a different second version of the validation agent. In this example, the validation agent is deleted from the remote delivery machine between the delivery of the first piece of content and the delivery of the second piece of content. Thus, copying the validation agent for even attempted hacking is difficult or impossible, as the validation agent only exists on the remote delivery machine for a short amount of time. Moreover, even if a nefarious user is able to copy the validation agent, any reverse engineering performed on the validation agent would be fruitless, as the future capabilities and requirements of the validation agent will have changed.

As noted above, the validation agent is configured to examine the remote delivery machine to determine whether it has been compromised. This examination may encompass any of a plurality of tests, searches, scans, or interception of data sent to or from the remote delivery machine, the results of which could aid in the determination of whether the remote delivery machine is compromised. For example, the validation agent could perform various memory and other media searches to insure that the correct software, including but not limited to the player software, usage tracking features, and secure payment systems, have not been tampered with, altered, or otherwise modified, and that such software is functioning properly on the delivery machine. The validation agent could also perform various memory and other media searches to insure that pernicious software is not executing on or affecting the performance of the delivery machine. That is, if such pernicious software is executing, functioning of the player software may be occurring as expected, but the additional software may alter the functioning of the remote delivery machine as a whole, and therefore should be detected. The validation agent may also perform certain hardware observations or tests to insure that the validation agent is not trapped inside a virtual environment or is otherwise being spoofed. Finally, the validation agent may perform certain timing tests to insure that the delivery machine and its software are operating properly, and that the validation agent itself is not captured inside a virtual environment or is not otherwise being spoofed.

The tests that can be performed by the validation are numerous and are not limited by those tests and observations described below. By way of example, the following tests and/or observations are provided.

In one example, a checksum of the disk images of various software components may be determined and compared to known good checksums to verify that the software components are what they purport to be, and have not been altered. The determination of checksums as described could include the application advanced methods such as CRC-32 to eliminate false sum matches and prevent hackers from performing a technique known as sum balancing. In the checksum determining example, the checksums of various software components could be determined and verified, including the checksums of software provided by the host machine such as player software, digital rights management components such as shopping browser software and usage tracking software, drivers provided by the host machine, and the validation agents themselves. Checksums could also be determined and compared for essential or non-essential third-party device drivers, essential or non-essential operating system components, essential or non-essential recognized applications not distributed by the host machine, and/or essential or non-essential recognized drivers not distributed by the host machine.

The described checksum operations can also be performed on code segments in memory, though checksum operations performed on data segments may be unhelpful in one embodiment because the data segments are subject to change during program operation. Alternatively, the checksum operations may be performed on components of the remote delivery machine's Basic Input/Output System ("BIOS").

The disclosed system may also perform functional tests to determine whether the remote delivery machine has been compromised. For example, the distributed validation agent of the disclosed system may perform functional tests of various available software interfaces of any of the software components described above to verify that the software components are what they purport to be. Likewise, the validation agent may perform functional tests of the hardware of the remote delivery machine, such as by circumventing the operating system and drivers operating above the hardware on the machine. These tests can verify that the hardware has not been tampered with, and that the hardware is not a virtual emulation of real hardware.

The functional tests described may also include timing tests. In these timing test, the turnaround time of packets at the client and server ends may need to be measured as a prerequisite to performing the tests. Upon determination of the turnaround times, the times may be compared to ensure that the time bases of the host machine and the remote delivery machine are accurate within a certain acceptable margin. Thereafter, a timing test may be performed by the host machine (or the remote delivery machine) sending a packet to be timed which packet includes a time stamp. The packet is passed back and forth with another time stamp attached each time. The set of time stamps associated with the packet enables both the host machine and the remote delivery machine to measure the relative timing differences of the two machines and would enable validation of the host machine if the timing is as expected.

The testing mechanisms described above may be performed by the distributed validation agent. For example, software within the validation agent may actually compare the checksum of other software on the remote delivery machine to a known checksum to ensure validity. Alternatively, the validation agent may gather the appropriate data from the remote delivery machine (such as the checksum data), and may send the data back to the host machine for further processing (such as comparison of the checksum data to the expected checksum data).

The disclosed system may also enable one or more of the described software components to be uploaded to a server, such as the host machine, for examination. For example, the validation agent may enable or cause player software, hardware driver software, or other appropriate software to be sent to the host machine for testing. This server-based testing may be either automatic testing performed according to one of the mechanisms described above, or may be manual testing performed by a human.

In certain embodiments, the validation agent performs one or more observations to aid in determining whether the host machine has been compromised. For example, the validation agent may analyze a hard disk, standard memory, or flash memory for the existence of known tools for stealing content. This observation may include a search for signatures of such known tools, wherein the signatures are small pieces of code unique to the particular piece of software. Alternatively or in addition, the validation agent may search for portions of the content in storage locations such as on a disk, in standard memory, or in flash memory. The disclosed system may also perform one or more observations by temporarily halting playback of content, and observing whether any data that is accumulating on the machine stops accumulating instantly. If an accumulator is operating on the machine and encrypting the content data as it accumulates, it is possible that such an observation could catch the accumulator in action, indicating that the remote delivery machine is compromised.

Regardless of which of the above-described mechanisms is utilized to determine that the remote delivery machine is compromised (and regardless of which portions of the determination are carried out by the remote delivery machine or the host machine), a determination that the remote delivery machine is compromised in one embodiment results in the content not being delivered to the remote delivery machine, as described above.

In many modern computer systems, attacks to the system are not limited to just the upper or application layer. That is, certain attacks occur on the system or kernel layer, such that while the application layer may remain unaltered, the underlying system layer can be changed for nefarious purposes. Thus, in a further embodiment of the disclosed system, wherein the remote delivery machine includes a hardware layer, a system layer, and an application layer, as discussed with respect to FIG. 2, the disclosed system distributes a multi-layer validation agent to operate in more than one layer, thus validating the remote delivery machine at more than one different layer.

For example, a multi-layer validation agent may include a portion to validate the application layer and a portion to validate the system layer. While an application layer portion of the validation agent may perform the examination described above, a system layer portion may operate at the system layer to provide additional security. The system layer portion of the validation agent may perform one or more system layer examinations to ensure that the remote delivery machine has not been compromised. For example, the system layer portion of the validation agent could be distributed by the player to the system layer, perform one or more tests, examinations, or observations, and report the results back to the portion of the validation agent residing in the player. These results are then communicated to the host device for validation of the remote delivery machine.

Alternatively or in addition, the system layer portion may actually perform the decryption of the delivered content immediately before the content is delivered to an appropriate device driver for output using an appropriate output device, thus reducing the potential points of attack. This functionality may prevent kernel level attacks about the hardware device driver level. In this way, through the use of a player and user layer validation agent, a kernel module such as a driver and a kernel layer agent, and decryption at the kernel level, content can be protected and managed all the way down to the computer hardware.

It should be appreciated that different portions of the validation agent could operate at different levels of the remote delivery machine to validate different aspects of delivery of the content. For example, an additional portion of the validation agent could verify that appropriate hardware is being used to output the content—such as a monitor and speakers instead of a recording device. In all cases, however, it should be appreciated that the ability to alter the validation agent, due to its relatively short existence on the remote delivery machine, advantageously reduces the opportunity for nefarious users to alter the functioning of the remote delivery machine and thereby improperly obtain access to the distributed content.

In an embodiment wherein the validation agent operates at a plurality of different levels of the remote delivery machine 200, the agent may operate according to the process 300 illustrated in FIG. 3 for each of the levels on which it operates. For example, if the validation agent includes a portion operating on the system layer and a portion operating on the application layer, the host system may send the validation agent to the application layer of the remote delivery machine. The application layer may then execute the validation agent, which in turn performs a set of tests or observations at the application layer, as described above, to validate that the application layer is not compromised. These observations may be performed, as described, on the application layer itself, including the player software and the validation agent executing on the application layer. The validation agent, operating at the application layer, may thereafter communicate the results of the observations back to the host machine, which may use the results to determine whether the application layer is compromised. It should be appreciated that this process is performed substantially as described above with respect to FIG. 3.

In an embodiment wherein the validation agent includes a portion to validate that system layer, that portion may thereafter be sent to the system layer of the remote delivery machine and executed at that layer. For example, the agent may be executed as part of the audio decryption driver and/or as part of the video decryption driver. After performing appropriate tests (e.g., tests to ensure that the drivers themselves are not sending the content to a storage device as opposed to an output device), the validation agent sends the results from the tests performed at the system layer back to the host machine. The host machine determines whether the system layer has been compromised, and only after determining that the system layer has not been compromised, sends the requested content to the remote display machine for output.

In various embodiments, the processes described above with respect to the application layer and the system layer does not occur serially, as discussed. For example, the observations may be performed at the application layer and at the system layer substantially simultaneously, and the entirety of the results compiled, before sending the results to the host device. Alternatively or in addition, the entire validation agent (including the application layer portion and the system layer portion) may be delivered to the remote delivery machine substantially simultaneously, and the individual components may thereafter function substantially independent of one another.

The system disclosed herein may additionally enable users, upon requesting certain content, to provide verification or authentication data to the host machine prior to receiving the requested content. For example, the disclosed system may enable a user to provide a login name and password as a prerequisite to obtaining content from the host machine. In this way, the system may enable the host machine itself to perform some of the determinations as to whether a person has rights to consume the desired content. The system may still rely on data from the remote delivery machine to determine an amount of use of the content (e.g., the remote delivery machine may send an indication of a number of plays of a digital audio file to the host machine), but the use of the login/password scheme enables the system to verify a user prior to an initial request for content. Alternatively, the system may rely for verification on the user providing a certificate via the remote delivery system, or verification of a user by a validation agent operating on the remote delivery machine.

In embodiments wherein a user's identify must be verified prior to the user being provided with the requested content, the process 300 of FIG. 3 may be augmented by enabling the user to communicate his or her choice of content, along with any appropriate verification data, to the player of the remote delivery machine. The player may thereafter communicate the data provided by the user to the host machine 100. After this communication, the process 300 may include an additional step prior to the step illustrated at block 302, wherein the host machine verifies the data provided by the user. If the host machine verifies the data, the host machine acts on the requested content, as described at block 302 and onward.

The disclosed system may also enable the content decryption mechanism to be downloaded by the remote delivery machine along with the content. For example, the host machine may package the encrypted content with sufficient data, such as a decryption key, to enable the remote delivery machine to decrypt the received content. Thus, only upon downloading the content is the system able to discern the appropriate decryption mechanism.

Such an arrangement is advantageous because the decryption mechanism does not reside on the remote delivery machine, which makes attacking or hacking the decryption mechanism substantially more difficult. In addition, if the agent determines that the remote delivery machine has been compromised, the decryption information will never be delivered to the remote delivery machine. Thus, an already-compromised remote delivery machine would never provide a nefarious user with an opportunity to reverse engineer or otherwise hack the decryption algorithm. In either instance, sending the decryption algorithm along with the encrypted content, and only upon confirmation that the remote delivery machine has not been compromised, may provide advantages over known content management systems.

In embodiments such as those described above, wherein individuals utilizing the system may be both content consumers and content producers or providers, the disclosed system may enable access to the content according to additional content access schemes. For example, a content producer may upload content only upon providing an appropriate payment to upload. In exchange for such a payment, however, the content producer may indicate how its content is to be consumed. That is, a content producer in this embodiment may indicate the content consumption scheme for other users of the system. Thus, a content producer may indicate that consumers can pay for unlimited access to the content, can pay for unlimited access during a limited period of time, or limited access during a limited period of time. Likewise, the content producer may indicate that the consumers may consume the content, but must provide continuous or recurring payments during the course of consumption of the content.

In one embodiment, the system disclosed herein, implemented as a peer-to-peer content sharing system, may require a payment from each user in exchange for access to the content in the system. For example, the user may pay a monthly fee to an entity responsible for maintaining the system, and in exchange may receive access to any of the content distributed by the system. Alternatively, the amount of access during the course of the time period spanned by the payment may be limited, such as by being limited to an amount of bandwidth usage, amount of time spanned by played-back content (e.g., a number of minutes of video), or limited according to some other appropriate measurement of content consumption.

It should be appreciated that the disclosed system may enable any type of content distribution scheme to be implemented, and is not limited by the exemplary content distribution schemes disclosed herein. In addition, the disclosed system, when implemented as a peer-to-peer system, may enable the users of the system to alter or otherwise set the parameters associated with the content distribution and consumption in any way appropriate to implement such content distribution schemes. For example, the system may enable users to set access permissions, payment requirements, the ability to alter or otherwise augment content, or any other action with respect to the content distributed by the system.

[Authoring Software Begin]

The player disclosed herein has been described primarily as a mechanism for outputting content distributed by the system. It should be appreciated that the player may also enable authoring or alteration of content. This is particularly true in the context of a peer-to-peer system such as the one described above in which individual users are both producers and consumers of content. For example, the player may include one or more authoring tools that enable the users to create and/or alter content for consumption by other users. These authoring tools could include photo editing tools, video editing tools, audio editing tools, software development tools, web site editing tools, or any other appropriate tools to enable alteration of digital content. In addition, the authoring tools may interface with user-operated hardware devices, such as audio or video capture devices, external memory devices, or other types of hardware, to enable users to create digital content sharable with other users.

If the disclosed player software includes certain authoring tools such as those described above, many of the encryption and other security principles described above with respect to content distribution may be applied in sending content from a client machine to the host machine. It should be appreciated that in such embodiments, the client machine, at which the content is authored or altered, may be viewed as analogous to the host machine in the description above, and the server may be viewed as the remote delivery machine. Thus, prior to uploading content to a server, a client machine of a user who has authored that content may send an agent software module to the server to enable validation that the server has not been compromised. Upon determining that the server has not been compromised, the content may be uploaded to the server for future distribution to other users of the system. In addition to the content being uploaded, the client machine may enable the user/author to specify access parameters of the content, such as by identifying one or more content distribution schemes by which the user/author wishes others to access his or her content. Alternatively or in addition, the user/author may specify an amount of one or more payments associated with the content, such that the user/author may be paid for consumption of his or her content.

[Authoring Software End]

The disclosed host machine may store and distribute player software to the remote delivery machine on an as-needed basis, such that a nefarious user cannot hack or otherwise compromise the player software. For example, upon receiving a request to deliver content from a remote delivery machine, the disclosed host machine may send a validation agent (or portion thereof) to the remote delivery machine. Upon confirmation that the remote delivery machine is not compromised, the host machine may thereafter serve a player software module to the remote delivery machine for outputting the to-be-delivered content. For example, the host machine may send a video player to the remote delivery machine. In one embodiment, the player software module does not include any further security features—rather, it enables playback of the appropriate kind of content. In another embodiment, the player software module includes at least one security feature, such as a decryption algorithm associated with the content to be outputted to the end user. In this embodiment, the player may thus be required to output the particular delivered content, such that without the particular served player module, the content is not consumable.

The decryption algorithms and other security features enabled by the player software module may change with time, much as the specific features and tests run by the validation agent can change with time, as discussed above. Further, the player itself may perform one or more of the observations or tests otherwise performed by the agent, such that if either the player or the agent is compromised, the host machine will still have an un-compromised software module on which to rely for validation of the remote delivery machine.

In one embodiment, the disclosed content management system enables the distribution of content generated by commercial content generators, such as commercial music studios, commercial movie or television studios, commercial software developers, and the like. In this embodiment, the content creator may not be interested in obtaining other content via the disclosed content management system—rather, the content creator may be concerned primarily with distributing its own content, and may not need to be able to download and consume other content.

In another embodiment, the disclosed system may be used by a plurality of users to share user-generated content with one another. For example, if two users wish to share photos with one another, the disclosed content management system can be used to provide secure transfer of content and can prevent the further distribution of the content beyond the particular user with whom the content is desired to be shared.

For example, the disclosed content management system could enable multiple users to engage in live or recorded sessions, wherein during a given session, the users can view others content, including text, photos, audio, and video. Likewise, during such live or recorded sessions, a user can record his or her own text, photos, audio, and video, and submit them to the host machine disclosed herein for future distribution. Upon submitting such content for distribution, the user can also set one or more rules by which his or her content must be accessed. For example, the user can constrain the viewing audience, the viewing time, the number of viewings, and/or the expiration dates or times of the provided content.

In order for a user to control access to his or her content, the user may define one or more access parameters associated with the content. For example, the user may define a group of consumers, a time period for consumption, and a maximum number of outputs of the content allowed for consumption. The content, along with the access parameters, are uploaded to the host machine 100 as discussed above. When another user wishes to access the content, the host machine distributes the content, according to the access parameters, as discussed above with respect to process 300. Specifically, the host machine sends a validation agent to the potential consumer's remote delivery machine. The validation agent performs one or more tests or observations to ensure that the potential consumer's remote delivery machine has not been compromised. In addition, the validation agent may determine, based on the one or more access parameters, whether the potential consumer satisfies the access parameters and thus is authorized to receive the content. Alternatively, the player as described above may determine whether the potential consumer is authorized to receive the content. In either case, if the remote display machine is not compromised and if the potential consumer is authorized to consume the content, the host machine sends the content, along with any necessary information to enable decryption of the content, to the remote delivery machine for delivery to the content consumer.

During consumption of the content, the consumer may be allowed to play back audio and video and to view photos and text, as is known in the art. Player software, resident on the remote delivery machine, may enable this consumption. After the content has been fully consumed (e.g., after a content consumption timer has expired), the remote delivery machine restricts the consumers access to the content and deletes the local copy of the content from the remote delivery machine. Thus, the host machine/remote delivery machine combination ensure that content is distributed only when the destination is validated, and removes the content when the amount of allotted consumption is over.

The disclosed system may also ensure that content is deleted after it has been completely consumed. In one example, this verification occurs by the sending of a delete message from the host machine to the remote delivery machine, and the receipt of an appropriate delete confirmation by the host machine from the remote delivery machine. Alternatively, the host machine may directly delete the content from the remote delivery machine, and may thus directly verity such deletion. In one embodiment, one or more of the player and the validation agent aid in or perform the actual deletion of the content. In one embodiment, deletion is verified by each of a plurality of portions of an agent running at each of a plurality of hardware and/or software layers of the remote delivery machine.

The disclosed system may verify deletion of data, such as content, software modules, or other information, from the remote delivery machine in a plurality of different ways. For example, the system may analyze one or more memory devices (e.g., RAM, solid state memory, flash memory, hard disk drives, etc.) of the remote delivery machine at different times after the deletion is expected to have occurred to see if any portion of the content remains on any memory device. The system may scrutinize data accumulating on the remote delivery machine at the same time as the content is being output. If there is suspicion that accumulating data may be the streaming content, the system may stop streaming the content and may see whether the other accumulation stops. In addition, the system may compare the reported sizes of accumulated content with the actual sizes of those files in memory. The system may also circumvent the operating system running on the remote delivery machine and may analyze hardware directly. For example, the system may analyze whether anything is stored on a disk drive which is outside the scope of the file system. If so, that information may be further analyzed to determine whether the stored information is the content.

The disclosed system may enable live exchange of content using a similar mechanism to that described above. In such an embodiment, an agent validates a remote delivery machine, and the host machine either enables a user to record content in real time, or is connected to a different machine which enables the user to record content in real time and sends the recorded content to the host machine. In either case, after the remote delivery machine has been validated, the content creating user begins recording content, and the host machine simultaneously begins delivering the live recorded content to the content consumer. As above, the content may be deleted as it is displayed, such that illicit copies cannot be made and/or redistributed.

Where the disclosed system is functioning as a content distribution system between multiple users, certain additional security measures may be taken to protect the content from unauthorized distribution. For example, each time one of the users connects with the host machine, the client machine, the host machine, or both may generate a new key pair for use during the session. Any files transferred during the session may be transferred in encrypted form, and may be decrypted using one or more of the key pairs generated by the client and/or the host machine. When the session is over (e.g., when a user is done uploading or consuming content), the system may remove the keys and may delete or otherwise make unavailable the temporary (i.e., cached) files generated during the session.

The disclosed content management system, when used to share content between users, could implement software modules to enable users to be charged for their use of the system. For example, any plug-in software needed to access the host machine could be provided to the user in exchange for a license fee. Alternatively, the user could be charged on a metered basis, such as based on an amount of bandwidth used, a total amount of data transferred, or an amount of time spent accessing the system.

The disclosed system, when utilized simultaneously by two users, may also enable the users to engage in Voice over IP ("VoIP"). In this example, a first users encoded voice data is sent to the host machine, distributed to the remote delivery machine as described above, consumed by the recipient (i.e., the recipient listens to the decoded voice data), and deleted, as described above. It should be appreciated that any other type of digital content may also be distributed using the disclosed system.

The host machine of the disclosed system may store one or more of the content, the agent, the decryption method, and other components of the system for delivery to the remote delivery machine. Upon delivery to the remote delivery machine, these components may exist only temporarily, such as by existing long enough to provide the requested content to the user in accordance with that user's rights. In some embodiments, a portion of the data sent by the host machine may be altered during delivery of the content to further enhance the security of the content. For example, the decryption algorithm may be altered in the middle of streaming a piece of content, such that a first decryption algorithm is used to decrypt a first portion of the content and a different second decryption algorithm is used to decrypt a second portion of the content.

FIG. 4 is a message flow diagram 400 of an example set of messages that are exchanged between a remote delivery machine and a host machine during the delivery of content disclosed herein, wherein the validation agent (and the decryption scheme for the delivered content) change during delivery of the content. Specifically, the message flow illustrated in FIG. 4 is an example set of messages exchanged between a remote delivery machine 200 and a host machine 100 wherein two different portions of a validation agent are sent to the remote delivery machine 200 and wherein the content is delivered in two portions, each content portion being decryptable with a different decryption algorithm.

The message flow 400 illustrated in FIG. 4 begins when the remote delivery machine 200 sends a request for content 402 to the host machine 100. The request could be for any type of content, and could be generated either in direct response to a user inputting a request for content, according to a schedule maintained by the remote delivery machine 200, or based on the occurrence of some other event (e.g., a web page being access which includes embedded content).

In response to the request for content 402, the host machine 100 sends a response that includes a first portion of a validation agent 404. As discussed, the validation agent, in one embodiment, is a software module executable by the remote delivery machine 200 to verify that the remote delivery machine has not been compromised. In response to receiving the first portion of the validation agent 404, the remote delivery machine 200 performs any appropriate validation observations and/or tests 450, the results of which are usable to determine whether the remote delivery machine 200 is compromised.

Following performance of those tests and/or observations, the remote delivery machine 200 sends validation data 406 indicative of the results of the tests and/or observations to the host machine 100. The host machine 100 determines, based on the validation data, that the remote delivery machine 200 is not compromised, and thus determines to deliver the first portion of the requested content 452 to the remote delivery machine 200. In the illustrated embodiment, the host machine 100 sends the first portion of the content and a corresponding decryption algorithm 408. In this embodiment, the decryption algorithm, which is sent along with the first portion of the content, is usable to decrypt the first portion of the content but not any subsequent portions of the content.

The remote delivery machine 200 thereafter decrypts and outputs the first portion of the content 454. Simultaneously or substantially simultaneously, the host machine in the illustrated embodiment sends a second portion of the validation agent 410 to the remote delivery machine 200 to ensure that the remote delivery machine 200 has not been compromised since execution of the first validation agent 450 and/or to ensure that the results of the execution of first validation agent were not spoofed. The validation agent on the remote delivery machine 200 again performs the appropriate validation observations and/or tests 456 and sends the resulting validation data 412 back to the host machine 100.

The host machine 100 determines, based on the received set of validation data, whether the remote delivery machine remains uncompromised—that is, whether to continue sending the requested content to the remote delivery machine 200. In the illustrated embodiment, the determination is to deliver a second portion of the content 458 to the remote delivery machine for output. Thus, the host machine 100 sends the second portion of the content and a corresponding decryption algorithm 414 to the remote delivery machine 200, and the remote delivery machine 200 decrypts and outputs the second portion of the content according to the decryption algorithm.

In one embodiment, after outputting both portions of the content, the remote delivery machine 200 sends content consumption information 416 to the host machine 100. For example, the content consumption information could include a quantity of times the content was consumed, a duration of the consumption, payment information provided in exchange for consuming the content, or any other suitable information relating to consumption of the content. As discussed above, this content consumption information could be sent by the player of the remote delivery machine 200, which in one embodiment is responsible for tracking an amount of use of content by the user at the remote delivery machine.

The host machine 100 in the illustrated embodiment determines that the content consumption is complete 462. It should be appreciated that this determination may mean that the user no longer has the right to access the content. In response, the host machine 100 may send a delete content request message 418 to the remote delivery machine 200 to cause the remote delivery machine 200 to delete the content and any validation agent software 464 that remains on the remote delivery machine. As discussed above, by deleting the content and the validation agent(s), the disclosed system minimizes the amount of exposure these components have to potential malicious users, thus making hacking or otherwise modifying these components difficult or impossible.

In the illustrated flow 400, upon deleting the content, the remote display system 200 may send a delete content confirmation message 420 to the host machine 100, such that the host machine 100 can be sure the content is deleted.

This arrangement may prevent an attack wherein the remote delivery machine is frozen (e.g., by holding the processor(s) in a reset state) while the memory of the remote delivery machine is copied or otherwise read. Although the host machine in this example may know that an attack has occurred, if the entire decryption algorithm or validation agent was present on the remote delivery machine, the decryption algorithm or validation agent may be subject to reverse engineering. On the other hand, in the disclosed system, the temporary and potentially incomplete nature of the delivery of the decryption algorithm or the validation agent means that complete reverse engineering is impossible or impractical. If a portion of the decryption algorithm and/or the validation agent is reverse engineered, the reverse engineering party could only obtain the data stored on the remote delivery machine at the time of reverse engineering could be obtained. Any data that would have been sent and decrypted using a different decryption algorithm or that would have been sent after validation according to a different set of observations would remain on the host machine and would not be susceptible to misappropriation. Further, even if a portion of the decryption algorithm or the validation agent is reverse engineered, the host machine could ensure that such reverse engineering would not be useful by not using the same decryption algorithm or validation agent again.

As discussed, certain software provided by the host machine to the remote delivery machine can change over time. In one embodiment, the changes are implemented, at least in part, by the efforts of a human programmer. For example, a person may select which decryption algorithm to use, which tests for the validation agent to run to validate that the remote delivery machine is not compromised, or other aspects of the functioning of the system.

In another embodiment, the host machine itself may automatically determine the aspects of the system relied on for security. For example, the host machine could create new validation agents, decryption algorithms, or other components of the system by mixing and matching from a set of components and/or by randomizing key portions of the algorithms used to validate the remote delivery machine or to encrypt and decrypt content. For example, the order of execution blocks, the order in which components are applied, observations are made, or their results are communicated, or the frequency with which the decryption and/or validation algorithms change during output of the content could be randomized by the host machine.

The disclosed system may enable or be configured to operate with known digital watermarking techniques to further prevent unauthorized distribution of digital content. For example, the disclosed system may be configured to embed or distribute content having embedded watermarks, such that future users of the content can verify the content by finding the watermark in the content. In one embodiment, the watermark is invisible without knowing precisely where the watermark is located, and does not alter the functioning or output of the digital content. For example, a watermark may be implemented as a digital signal within a piece of content, such that software knowing where the watermark should be can verify the watermark's presence.

In one embodiment, the player and/or the validation agent confirm that an expected watermark is present in a piece of digital content before outputting the digital content. For example, upon opening a piece of digital content (streaming or otherwise), the player may execute code to examine a particular portion of the digital content for the watermark. If the watermark exists, the player may output the content. If the watermark does not exist, the player may do one of a number of things. For example, the player may play the content and inform the host machine of the lack of the watermark, may store data in association with the remote delivery machine and/or the user at the remote delivery machine indicating that the content is unauthorized, may refuse to play the content, or may take some other action in view of the potential unauthorized nature of the content.

The disclosed system may also implant bad code in a portion of the digital content. This bad code may be used to prevent playback of unauthorized copies of the content. For example, the player software may look specifically for the existence of bad code and may output the digital content only upon finding such bad code. Moreover, copying of the digital content using conventional copying techniques may result in copying of the content without the bad code. Thus, unauthorized (i.e., copies) content may not be playable using the player software, since the player software would not find the bad code in a copy of the content and thus would not output the content.

In certain embodiments disclosed herein, communications between the remote delivery machine and the host machine are initiated by a user at the remote delivery machine. That is, the user requests content or otherwise provides input that causes the host machine to send (or make available) the validation agent to the remote delivery machine. The disclosed system may also be implemented in a "push" environment, wherein the host machine initiates communications or "pushes" content to the remote delivery machine. In an example of such an implementation, the server may send the validation agent to the remote delivery machine without receiving a request from the remote delivery machine, such as according to an automated schedule.

In an example wherein the system disclosed herein enables a party to upload content to the host machine for distribution (as opposed to the content being served by the content creator or a representative of the content creator), the system may require the uploading entity to provide authentication or other information to verify that the uploading entity is who it purports to be. The authorization may occur at the time the player software (or other authoring software) is initially installed on content author's machine.

The authorization of a content provider may occur as a part of the provider registering to use software on its local machine. For example. In different embodiments, the level of authorization required may vary. For example, in an environment wherein security is less critical, the host machine may merely require a remote content author to click an "OK" or similar button indicating that the remote content author is who it says it is. In a more secure environment, test results similar to those generated by the validation agent, as described above, may be utilized to verify that the content author is who it purports to be. In a still more secure environment, test results may be utilized in conjunction with a handshaking sequence between the remote machine and the host machine.

The disclosed system may also be implemented in an effort to avoid informing hackers who are identified as hackers how they were so identified. This may be done by utilizing a plurality of danger words linked to the time of day or other fairly random bits of information that both the client and the server know. These danger awards could be pieces of code, data, handshaking sequences, or other appropriate information. The system may prevent hackers from understanding what about the hacking sequence gave away the hacking by delaying the apparent detection of the hack. For example, the server might react to the discovery of a hack a few minutes after it is actually discovered, thus obscuring when or exactly how the hack was discovered.

The system may also or alternatively perform a plurality of handshake procedures in the background during an entire content transfer session. In one embodiment, these handshakes are performed only if there is sufficient bandwidth to enable the handshakes without interrupting the content transfer. Most of the handshakes may be meaningless—that is, the server may make determinations as to the state of the connection with the client only based on a small percentage of the handshakes. However, by including a consistent stream of handshakes, the system requires a potential hacker to analyze each of the handshakes to determine which ones are real. In addition, for handshakes that are exchanged empty of content, the empty space could be filled with tools and data (e.g., a new version of the player and/or validation agent software) without alerting the hacker that the data being transferred is meaningful.

As discussed above, the disclosed system may alter the encryption and/or decryption schemes utilized to encrypt and decrypt the results of tests and observations performed by the validation agent according to various changing criteria, such as based on the time of day or the day of the week. In addition, these types of encryption and/or decryption schemes could be utilized to obfuscate the data that constitutes "yes" and "no" responses.

These types of encryption and/or decryption schemes could also be utilized to encrypt and/or decrypt messages sent during handshake sequences between the host machine and the remote delivery machine. An example handshake sequence, including certain encoding operations to obfuscate the contents of the handshake sequence, is described below. In this example sequence, the server sends a random number of random bytes up to a certain number of bytes (e.g., 26 bytes) to the client. These bytes may be random except for the last byte, which balances the XORed value as described below. The client checks to see if the communication from the server is valid by XORing all of the bytes together and determining whether the result is zero. A result of zero indicates a valid server communication. The client may then XOR the entire remaining block to be sent with the first byte. The client may take the first byte of the resulting remaining block and may send that number of subsequent bytes plus one, padding as necessary at the end of the block. For example, if the value of the first byte was 42, the client would send 43 bytes to the server, starting with the byte after 42. The last byte would not be data, but rather would insure that the XOR operation performed on the bytes form the client always resulted in the number 57. The server may check to see if the received message is a valid client communication by XORing all the bytes together from the client and making sure the result is 57. The process may then repeat, with the server sending another random number of random bytes as described above.

In the example described above, some of the data is encoded in the number of bytes that are sent over in each handshake. It should be appreciated that this process is one example of how handshaking may be used to encode data sent to the server. Handshaking obfuscation of this type may be used for both uploads and downloads. It should be appreciated that without access to both the client and the server, hackers may be prevented from watching both sides of the execution of the algorithm, thus further securing the data sent between the client and the server.

The disclosed system may enable a validation agent which is continuously resident on the system to check in at the time a user requests content. It should be appreciated that in any situation in which compromise of the system is seriously suspected, however, the continuously resident validation agent may be analyzed as well as described above to insure it too has not been compromised.

The host machine disclosed herein may enable download of a validation agent prior to the validation agent being used. For example, to insure a relatively consistent amount of bandwidth usage, the disclosed system may enable download of a validation agent prior to content being requested. The validation agent may reside on a memory device of the remote delivery machine until it is needed, and may reside in encrypted form. The validation agent may be unencrypted and run, such as using a public key supplied to decrypt the validation agent, at the time of execution of the validation agent.

The disclosed system may also maintain the decryption algorithm needed to decrypt the content, the player software module, the agent module, or any other encrypted data on the server, and may only enable the remote delivery machine to download the decryption algorithm when necessary. Thus, the availability of the decryption algorithm to hackers and other nefarious users is severely limited, making compromise of the system more difficult and unlikely.

The disclosed system may further utilize bad code to protect the content distributed by the system. For example, the server may interrogate the client in a plurality of different ways, only a portion of which are observable over any period of time. Before this period of time elapses, the client code may be replaced with other client code. Some of the code sequences could be bad sequences that would crash the client machine, but the server may avoid activating the handshake patterns to deliver these bad sequences. This could thwart a hacker trying to reverse engineer the client using a fake server that just ran through all possible variations of the handshake sequences.

In addition, part of the handshaking could cause the handshaking code to modify itself to repair some broken sections, to break certain working sections, or to modify working sections to operate differently. For example, the client may generally indicate to a generic server that it is client X running at date and time Y. The server may respond by indicating that it is server A running at date and time B. The server may further instruct the client to modify section C of its code by XORing it with a number sequence D provided by the server. After the client performs this action, the server may ask the client what content it wants, whereupon the client may respond using its modified section C to indicate the name of the content. If the client modification to section C was incorrect, the server would know that the client was compromised. It should be appreciated that such an embodiment may be most applicable in code which is intended to reside on the client for a relatively long amount of time, as this is the code which is most likely subject to reverse engineering.

Certain embodiments of the disclosed system which utilize bad code may utilize static bad opcode sections which are identifiable by disassembling the code. Other embodiments may use bad code segments which are incompatible with the system it is running on, but which are not bad opcode. These embodiments may be more difficult to reverse engineer, as simple disassembly may not identify the incompatible code.

Bad code utilized for reverse engineering may be voluminous and machine generated. That is, software may write volumes of abstruse client code (and corresponding abstruse server code) such that abstruse handshaking can take place. In this embodiment, a human being may need to analyze the code, line by line, to reverse engineer the code. Thus, hackers may be overwhelmed with the complexity of reverse engineering of a piece of code.

It should be appreciated that many of the embodiments described above limit the amount of time the software of the instant system is available to hackers. However, certain of these embodiments also perform according to other principles which make the system more difficult for hackers to compromise. For example, the system may limit the time window within which hackers could capture and attach file encryption. The system may limit a hacker's ability to access the code associated with the software modules of the system, which access could make the system easier to reverse engineer. In this example, handshaking performed between the remote delivery machine and the host machine may put a portion of the code interaction outside the hacker's view, such that the ability to watch execution at both the machine level and the functional is limited by the machine level of the handshake being performed on a protected server.

The disclosed system may also be configured to automatically generate portions of code contained in certain software modules, such as in the validation agent and/or in the player software module. Some of this machine-generated code may include bad code blocks or blocks of self-modifying code, the position of which may be changed by the machine as different versions of the software are generated and distributed. In an embodiment when the software is executed by a system which knows where the bad code and/or self-modifying code segments are located, the system may avoid or otherwise appropriately handle the bad code and/or self-modifying code segments. However, if the software is executed by a modified or illicit system, the system may not know how to handle such code segments, and thus may be unable to execute the illicitly obtained software modules.

The system may shuffle or change the position of the bad and/or self-modifying code segments within the software modules, such as by inserting the bad and/or self-modifying code directly below a branch and ending with a branch. The algorithm for shuffling such blocks of code may be similar to shuffling a deck of cards, and may include (i) inserting an unconditional branch pointing to the next block of code after each conditional branch and (ii) moving each block to a random location between two other blocks, updating the absolute branches as needed to maintain proper execution order of the blocks. By thus shuffling the bad and/or self-modifying code blocks, the disclosed system may further impair efforts to reverse engineer its code.

Finally, the disclosed system may attempt to reduce hacking attacks by obfuscating hacking analyses performed about the system, and responses thereto, and making it difficult of impossible for future would-be hackers to obtain these analyses and utilize their contents to coordinate future attacks.

It should be appreciated that the disclosed content distribution management system presents several advantages over known content management systems. For example, the disclosed system can detect if either the player or any other software of interest on the remote delivery machine has been compromised and prevent the content from being delivered at all to the remote delivery machine. Prior systems attempt to prevent playback of the content only after the content has been delivered, while the validation agent architecture of the disclosed system enable delivery of the content to be avoided as a whole if the remote delivery machine has been compromised. Thus, the disclosed system can prevent attacks on the player itself, attacks on the usage tracking or management features, attacks on streaming functions where data could be accumulated and recomposed, and attacks on the secure payment system, as none of these components come into play if a compromised system is detected.

It should be further appreciated that the disclosed system is advantageous over known content management systems because it severely limits the amount of time a nefarious user has to reverse engineer the components of the system. First, since the content is delivered on an as-needed basis, the encryption schemes used to encrypt the content can change regularly. Thus, even if an old version of the encryption scheme is cracked, a new version can be implemented, rendering the previous hacking ineffective and obsolete. Since the agent could also be delivered on-demand, the exposure of the agent software to hacker activity is likewise limited. Further, since the communications between the agent and the host machine are limited and extremely fast, the amount of exposure of the communications themselves, which could result in spoofing of the communications, is limited. For at least these reasons, the disclosed system thus advantageously limits the amount of exposure of its various components to potential hacker activity, thus substantially improving the security of the content distributed by the system.

It should be appreciated that the claims appended hereto are not limited by the order in which the elements are recited unless the elements themselves address the order. Thus, the elements of the claims appended hereto could be performed in any logical order, and the scope of the appended claims should be understood accordingly.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A digital content access control system comprising:
at least one processor;
at least one network interface device;
at least one memory device which stores a plurality of instructions which, when executed by the at least one processor, cause the at least one processor to operate with the at least one network interface device to:
(a) cause a validation agent to be sent to a remote delivery machine over a data network, said validation agent configured to determine at least one result of at least one test performed upon arrival of the validation agent at the remote delivery machine,
(b) receive, over the data network, the at least one result of the at least one test performed upon arrival of the validation agent at the remote delivery machine,
(c) determine whether the remote delivery machine has been compromised based on the at least one result of the at least one test, and
(d) if the determination is that the remote delivery machine has not been compromised:
(i) cause at least a portion of the content to be sent, over the data network, to the remote delivery machine for delivery by the remote delivery machine to a remote user,
(ii) cause at least one decryption algorithm to be sent, over the data network, to the remote delivery machine, said at least one decryption algorithm enabling the remote delivery machine to decrypt and output at least the portion of the content,
(iii) receive at least one usage signal indicative of an amount of consumption of the content, and
(iv) if the at least one usage signal indicates that the content has been completely consumed, cause at least one delete signal to be sent to the remote delivery machine, the at least one delete signal causing the remote delivery machine to delete at least the portion of the content.

2. The digital content access control system of claim 1, wherein the validation agent is configured to determine a plurality of results of a plurality of tests, wherein a first test is of a first layer of the remote delivery machine and wherein a different second test is of a different second layer of the remote delivery machine.

3. The digital content access control system of claim 1, wherein if the at least one usage signal indicates that the content has not been completely consumed, the plurality of instructions cause the at least one processor to operate with the at least one network interface device to repeat (i) to (iv) at least once.

4. The digital content access control system of claim 1, wherein if the at least one usage signal indicates that the content has not been completely consumed, the plurality of instructions cause the at least one processor to operate with the at least one network interface device to repeat (a) to (d) at least once.

* * * * *